(12) United States Patent
Eriksson et al.

(10) Patent No.: US 7,188,300 B2
(45) Date of Patent: Mar. 6, 2007

(54) FLEXIBLE LAYER ONE FOR RADIO INTERFACE TO PLMN

(75) Inventors: Stefan Eriksson, Stockholm (SE); Arne Berglund, Upplands Vasby (SE); David Bladsjo, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 994 days.

(21) Appl. No.: 10/134,017

(22) Filed: Apr. 26, 2002

(65) Prior Publication Data

US 2002/0167969 A1  Nov. 14, 2002

Related U.S. Application Data

(60) Provisional application No. 60/287,401, filed on May 1, 2001.

(51) Int. Cl.
*H03M 13/03* (2006.01)
(52) U.S. Cl. .......................................... 714/790; 341/94
(58) Field of Classification Search ................. 370/537
See application file for complete search history.

(56) References Cited

U.S. PATENT DOCUMENTS

| | | | | |
|---|---|---|---|---|
| 6,341,125 | B1 * | 1/2002 | Hong et al. | 370/335 |
| 6,473,442 | B1 * | 10/2002 | Lundsjo et al. | 370/537 |
| 6,510,137 | B1 * | 1/2003 | Belaiche | 370/232 |
| 6,622,281 | B1 * | 9/2003 | Yun et al. | 714/790 |
| 6,675,347 | B1 * | 1/2004 | Razoumov et al. | 714/790 |
| 6,711,182 | B1 * | 3/2004 | Gibbs et al. | 370/537 |
| 6,751,772 | B1 * | 6/2004 | Kim et al. | 714/786 |
| 6,819,718 | B1 * | 11/2004 | Koehn et al. | 375/242 |
| 7,007,216 | B2 * | 2/2006 | Hong | 714/748 |

(Continued)

FOREIGN PATENT DOCUMENTS

EP     0938207     8/1999

(Continued)

OTHER PUBLICATIONS

English language abstract of EP Patent 1006692 published Jun. 7, 2000.

(Continued)

*Primary Examiner*—Albert Decady
*Assistant Examiner*—Sam Rizk

(57) ABSTRACT

Flexibly configurable layer one transport channels produce radio blocks in response to communication information and extract communication information from radio blocks. Each transport channel can include an encoder or a decoder coupled to and cooperable with a data puncturer or a data repeater. An information source can produce for each transport channel first configuration information and second configuration information, wherein the first configuration information is indicative of how the associated transport channel is to be configured if a first modulation type is used for a current radio block, and wherein the second configuration information is indicative of how the associated transport channel is to be configured if a second modulation type is used for the current radio block. The physical layer can include a description information source that provides description information from which various configurations of the transport channels can be determined. The description information source provides the description information in the physical layer in response to further information which the description information source receives from a higher layer and which is indicative of a service request initiated by a communication network.

18 Claims, 7 Drawing Sheets

U.S. PATENT DOCUMENTS

| | | | |
|---|---|---|---|
| 7,012,894 B2* | 3/2006 | Belaiche | 370/232 |
| 7,076,726 B1* | 7/2006 | Yun et al. | 714/790 |
| 2004/0032835 A1* | 2/2004 | Majidi-Ahy et al. | 370/252 |

FOREIGN PATENT DOCUMENTS

| | | |
|---|---|---|
| EP | 1006692 | 6/2000 |
| EP | 1009174 | 6/2000 |
| EP | 1047219 | 10/2000 |
| EP | 1093315 | 4/2001 |
| GB | 2349042 | 10/2000 |
| WO | 99/04338 | 1/1999 |
| WO | 00/62465 | 10/2000 |
| WO | 01/17283 | 3/2001 |

OTHER PUBLICATIONS

3G TS 25.212 V3.3.0 (Jun. 2000); 3$^{rd}$ Generation Partnership Project; Technical Specification Group Radio Access Network; Multiplexing and channel coding (FDD) (1999), pp. 8-60.

Huard, J-F, et al., "Realizing the MPEG-4 Multimedia Delivery Framework", IEEE Network, IEEE Inc., New York, USA, Nov. 1998, vol. 12, No. 6, pp. 35-45, XP000873126, ISSN: 0890-8044.

Gessner, C., et al., "Layer 2 and Layer 3 of UTRA-TDD", VTC-2000-Spring, 2000 IEEE 51$^{st}$, Vehicular Technology Conference Proceedings, Tokyo, Japan, May 15-18, 2000, IEEE Vehicular Technology Conference, New York, NY: IEEE, US, vol. 2 of 3, Conf. 51, May 15, 2000, pp. 1181-1185, XP000968056, ISBN: 0-7803-5719-1.

Berg, M., et al., "Performance Enhancements for the GSM/EDGE Radio Access Network", Vehicular Technology Conference Fall 2000, Sep. 24, 2000, vol. 6, pp. 2720-2727, XP010525080, Boston, MA, USA.

Lau, V. K. N., et al., "Multiple Access Control Protocol for Integrated Isochronous and Bursty Data Services", IEE Proceedings: Communications, Institution of Electrical Engineers, GB, Dec. 11, 2000, vol. 147, No. 6, pp. 311-316, XP006013999.

Kriaa, F., et al., "Coding of TFCI by Using Channel Optimised B-Adjacent Code for UMTS", ITG Fachberichte, VDE Verlag, Berlin, DE, Jan. 28, 2002, vol. 170, pp. 27-34, XP001094527, ISSN: 0932-6022.

"PLMN Radio Interface with Upper Layer Supervision of Layer One Transport Channels", U.S. Appl. No. 10/133,199, filed Apr. 26, 2002.

Balachandran K., et al.: "A Proposal for EGPRS Radio Link Control Using Link Adaptation and Incremental Redundancy", Bell Labs Technical Journal, Bell Laboratories, US, vol. 4, No. 3, Jul. 1999, pp. 19-36, XP000878195, ISSN: 1089-7089.

* cited by examiner

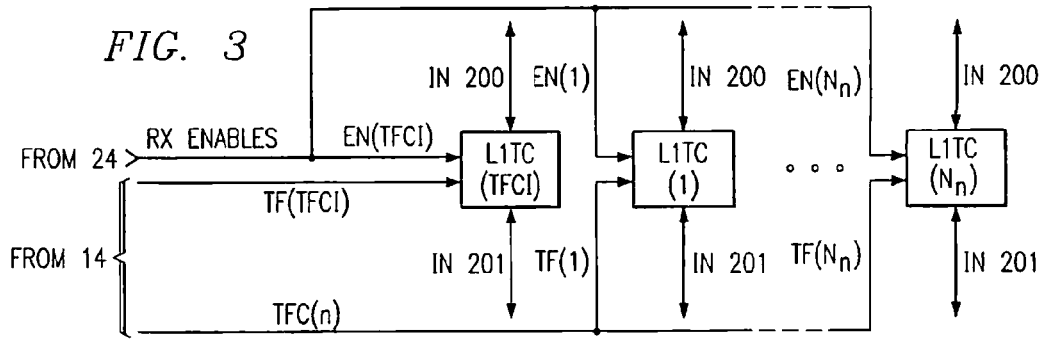
FIG. 3
FIG. 4
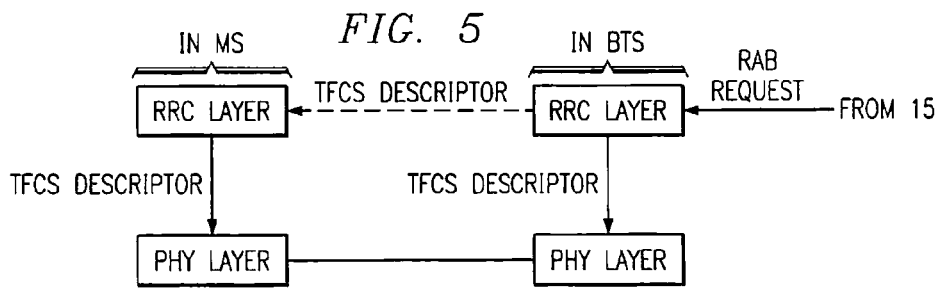
FIG. 5
FIG. 7
| FIELD VALUE | CRC TYPE |
|---|---|
| 000 | NO CRC |
| 001 | 6 BITS CRC |
| 010 | 12 BITS CRC |
| 011 | 18 BITS CRC |
| OTHER | RESERVED |

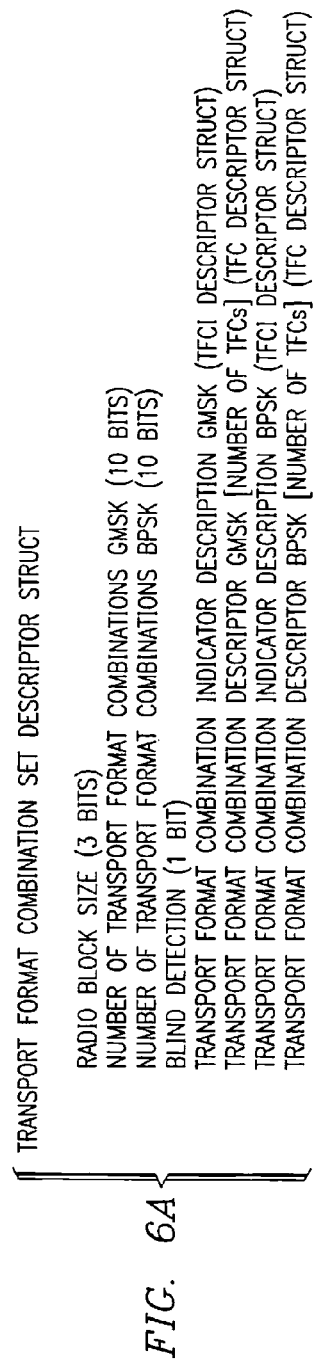

FIG. 6A

TRANSPORT FORMAT COMBINATION SET DESCRIPTOR STRUCT
{
  RADIO BLOCK SIZE (3 BITS)
  NUMBER OF TRANSPORT FORMAT COMBINATIONS GMSK (10 BITS)
  NUMBER OF TRANSPORT FORMAT COMBINATIONS BPSK (10 BITS)
  BLIND DETECTION (1 BIT)
  TRANSPORT FORMAT COMBINATION INDICATOR DESCRIPTION GMSK (TFCI DESCRIPTOR STRUCT)
  TRANSPORT FORMAT COMBINATION DESCRIPTOR GMSK [NUMBER OF TFCs] (TFC DESCRIPTOR STRUCT)
  TRANSPORT FORMAT COMBINATION INDICATOR DESCRIPTION BPSK (TFCI DESCRIPTOR STRUCT)
  TRANSPORT FORMAT COMBINATION DESCRIPTOR BPSK [NUMBER OF TFCs] (TFC DESCRIPTOR STRUCT)
}

FIG. 8

| FIELD VALUE | ERROR CORRECTION CODE TYPE |
|---|---|
| 000 | TERMINATED CC, K=5 |
| 001 | TERMINATED CC, K=7 |
| 010 | TAILBITING CC, K=5 |
| 011 | TAILBITING CC, K=7 |
| 100 | TERMINATED RECURSIVE SYSTEMATIC CC, K=5 |
| 101 | TERMINATED RECURSIVE SYSTEMATIC CC, K=7 |
| OTHER | RESERVED |

FIG. 9

| FIELD VALUE | RADIO BLOCK SIZE |
|---|---|
| 000 | 1392 BITS (8PSK FR) |
| 001 | 696 BITS (8PSK HR) |
| 010 | 464 BITS (GMSK FR) |
| 011 | 232 (GMSK HR) |
| OTHER | RESERVED |

| FIELD VALUE | RADIO BLOCK INTERLEAVE TYPE |
|---|---|
| 0000 | 4 BURST DIAGONAL |
| 0001 | 8 BURST DIAGONAL |
| 0010 | 19 BURST DIAGONAL |
| 0011 | 4 BURST BLOCK |
| OTHER | RESERVED |

```
TRANSPORT FORMAT DESCRIPTOR STRUCT
{
    SEND UP (1 BIT)
    NUMBER OF BITS IN (11 BITS)
    NUMBER OF BITS OUT (11 BITS)
    CRC TYPE (3 BITS)
    CODE TYPE (3 BITS)
    INTERLEAVING (1 BIT)
}
```

FLEXIBLE LAYER ONE FOR RADIO INTERFACE TO PLMN

This application claims the priority under 35 USC 119(e)(1) of copending U.S. provisional application No. 60/287,401, filed on May 1, 2001 and incorporated herein by reference.

FIELD OF THE INVENTION

The invention relates generally to the radio interface to a PLMN and, more particularly, to layer one of the radio interface and its interaction with higher layers.

BACKGROUND OF THE INVENTION

FIG. 1 diagrammatically illustrates a conventional example of a PLMN coupled to a mobile station (MS) 13 via a physical radio interface 17. The PLMN includes a radio access network 11 coupled to a core network 15. The core network 15 can be either a packet switched core network or a circuit switched core network. The mobile station 13 (any type of mobile radio transceiver) communicates with a base transceiver station (BTS) of the radio access network 11 via the radio interface 17. The physical layer, also referred to as layer one or the PHY layer, of the mobile station 13 (and the physical layer of the corresponding BTS of the radio access network 11) is responsible for transmission of data over the radio interface 17. On the transmitter side, layer one (L1) performs tasks including channel coding (error detecting and error correcting), interleaving, burst formatting, modulation and radio transmission. On the receiver side, layer one performs tasks including radio reception, synchronization, channel estimation, demodulation (equalization), de-interleaving and channel decoding (error correction and error detection).

Examples of the core network 15 include circuit switched or packet switched GSM, and circuit switched or packet switched UMTS. The radio access network 11 can be, for example, the GSM/EDGE radio access network (GERAN).

The PLMN of FIG. 1 is capable of providing a variety of services to its end users, each service having its own specific requirements regarding error rates, delay, etc. In order to accommodate the required services, the core network 15 requests from the radio access network 11 bearer services that transport information between the mobile station 13 and the edge of the core network 15. If the core network is a third generation (3G) core network, for example a UMTS network, the bearers (which provide the bearer services) are referred to as radio access bearers or RABs. A request for an RAB from a 3G core network to the radio access network 11 is specified by a set of RAB parameters. The RAB parameters contain a description of the information to be transferred, together with requirements on bit error rates, block error rates, delay, etc.

The RAB request contains information about the service to be supported by the call that is being set up, for example maximum bit rate, guaranteed bit rate, maximum payload size, maximum error rate, etc. The information in such an RAB request is typically independent of the type of radio access network 11. For example, the RAB request looks the same whether the radio access network 11 is GERAN or UTRAN.

In conventional radio access networks such as GERAN or UTRAN, layer one of the radio interface provides transport channels which either transport information from higher layers to the actual physical radio channel(s), or which transport information received from the actual physical radio channel(s) to the higher layers. Conventionally, these layer one (L1) transport channels are divided into two main types, optimized and generic.

With the optimized approach, the layer one transport channels are set up based on exact knowledge of the transported information blocks for a particular service. This permits, for example, voice to be transported efficiently over the radio interface. The speech frames can be unequally protected (UEP) and, just as important, unequal error detection (UED) can be used.

In the generic approach, the layer one transport channels are set up without detailed knowledge of the service. Generic transport channels use equal error protection and detection. Padding and segmentation can be used to handle variations in the payload size.

The optimized approach provides good spectrum efficiency for speech, for example AMR (adaptive multi-rate), but the optimized channel approach disadvantageously requires specific channels to be defined for each service. On the other hand, although generic transport channels are more flexible, they disadvantageously lead to poor radio interface performance for certain services, for example speech services.

Conventional layer one transport channels are static in the following aspects: the number of information bits to transfer per radio block is fixed; the error detection scheme for each part of the information block is fixed; the error correction scheme (including code type and rate) for each part of the information block is fixed; the puncturing pattern is fixed; and the interleaving is fixed.

There are a number of conventional predefined layer one transport channel schemes, for example optimized schemes that have been developed for AMR, and generic schemes such as GPRS, EGPRS and ECSD. According to conventional operation, higher layers choose a set of these predefined schemes depending on the service that is being supported.

As indicated above, the layer one transport channels generally interface between higher layers and the physical radio channel(s). For example, GERAN provides for radio transport via physical subchannels, where each physical subchannel is a sequence of GSM time slots that are allocated for the particular data transfer. A physical subchannel can be either a full-rate (FR) channel or a half-rate (HR) channel. A set of consecutive GSM time slots on a physical subchannel, used for the transfer of one block of data received from (or bound for) one or more layer one transport channels, is called a radio block. In some conventional systems, for example those that utilize GPRS and EGPRS, a radio block consists of four GSM time slots.

One or more types of modulation can be available for use on a given physical radio channel. For example, one or both of GMSK modulation and 8-PSK modulation can be used on the aforementioned GERAN physical subchannels.

It can therefore be seen that the actual gross data rate available for a data transfer depends on the data rate associated with the physical radio channel and the modulation used on the physical radio channel. In the GERAN example, the data rate available for data transfer depends on whether the physical subchannel is full-rate or half-rate, and also depends on whether the modulation is GMSK, 8-PSK, or a combination thereof.

Some examples of conventional layer one transport channel schemes for services defined in GERAN are described below.

The layer one transport channel schemes for AMR are examples of optimized schemes, i.e., they are tailor made to give the best possible performance for a particular speech codec. To provide transport of AMR speech over the radio interface, a number of layer one transport channel schemes are defined. There are currently eight different speech codec modes defined for AMR. For each of these eight modes, a layer one transport channel scheme for transport over a full-rate physical subchannel with GMSK modulation is defined. Further, for six of the modes, layer one transport channel schemes are defined for transport with GMSK on a half-rate physical subchannel.

The speech information is delivered to layer one in blocks (also denoted as speech frames) the size of which depends on the AMR mode. One speech frame is delivered every 20 ms. Below follows a description of exemplary layer one transport channel processing for the AMR 12.2 mode for transport over a GMSK FR channel.

The speech frame delivered from the speech codec consists of 244 speech bits and two inband bits (used for signalling). Of the speech bits, 81 are more important for the speech quality, and therefore more sensitive to errors (called class 1A bits). The remaining 163 bits are less sensitive (called class 1B bits). The speech bits are sorted by layer one according to their importance, putting the class 1A bits first and the class 1B bits after. Six CRC bits are added after the 81 class 1A bits, giving 87 bits. The class 1B bits are put after the CRC bits. All these bits are then encoded together using a convolutional coder with rate $R=\frac{1}{2}$. This results in an encoded block of 508 bits. Sixty encoded bits in the latter part of the encoded block (corresponding to the class 1B bits) are punctured (i.e., not transmitted). Effectively, this increases the code rate of the class 1B bits, giving them less protection. This results in a block of 448 bits. The 2 inband bits are encoded to 8 bits using a block code. The encoded inband bits are put together with the encoded speech bits, giving a block of 456 bits. Finally, the 456 bits are diagonally interleaved over 8 half bursts and transmitted over the radio interface.

For each of the other AMR modes, similar layer one transport channel schemes are defined. A particularity of the layer one transport channel schemes for AMR is that different parts of the information are given different degrees of protection against errors. Further, one part is protected with error detecting codes, while other parts are not. This unequal treatment of different parts is referred to as unequal error protection (UEP). The layer one transport channel scheme for each mode is very specific for that mode, and can not be used for any other mode, and definitely not for other services.

The layer one transport channel schemes of EGPRS are examples of generic schemes. They are not optimized for a particular service. The packets of data to be transferred can have any size. The packet is segmented by the RLC/MAC layer into RLC data blocks of a size that fits the layer one transport channel schemes. On the receiving side, the packet is reassembled from the received RLC data blocks.

The layer one transport channel schemes of EGPRS do not treat any particular part of the RLC data block differently. However, the RLC/MAC layer adds an RLC/MAC header to each RLC data block, which is given more protection than the RLC data block. In some sense, the EGPRS layer one transport schemes are optimized, since they require a specific RLC/MAC header size and a specific RLC data block size. However, they are not optimized for a certain type of user data (i.e., they do not assume any particular size or structure of the data packet before segmentation).

In EGPRS, nine different layer one transport channel schemes are defined, called MCS-1 to MCS-9 (Modulation and Coding Scheme). Each has a different RLC data block size. MCS-1 to MCS-4 uses GMSK modulation, while MCS-5 to MCS-9 uses 8-PSK modulation. In GERAN, only FR physical subchannels can be used. The nine schemes have different degrees of error protection. In each radio block the scheme is chosen based on the channel quality, to maximize the throughput.

Below follows a description of an MCS-6 example.

To layer one a block having a total of 622 bits is delivered. The first 28 bits are the RLC/MAC header, of which the first three bits define a field called USF. The remaining 594 bits are the RLC data block. The USF field is encoded with a block code to 36 bits. To the 25 remaining RLC/MAC header bits, an eight bit CRC is added, giving 33 bits. These are then encoded with a tail-biting convolutional code with rate $R=\frac{1}{3}$. Finally, one spare bit is added, giving a block of 100 bits. The encoded RLC/MAC header is interleaved. To the 594 bits of the RLC data block a 12-bit CRC is added, giving 612 bits. These are encoded with a convolutional code with rate $\frac{1}{3}$, and punctured. The puncturing is evenly distributed throughout the block, giving equal protection to all bits. After puncturing, the block has 1248 bits. The encoded RLC data block is also interleaved. Finally, the encoded USF, RLC/MAC header and RLC data block are put in a radio block and transmitted.

New services are continuously being introduced in the PLMN, and radio access networks such as GERAN are expected to provide bearers capable of handling these services. For example, the following new services have been discussed in the GERAN standardization: adaptive multi-rate wideband speech (AMR WB); and voice over IP services.

Further, it is desirable to be able to transport the information of such new services over different types of physical channels (e.g. FR and HR) and with different modulations (e.g. GMSK and 8-PSK) Another desirable improvement is to be able to transport old services over new physical channels or with new modulations. For example, AMR narrowband (NB) with 8-PSK over a half-rate physical subchannel has been discussed. For each combination of service, physical channel and modulation, new layer one transport channel schemes are needed.

Some drawbacks associated with the current way of specifying layer one transport channels in GERAN are discussed below:

New circuit switched voice services have been introduced in GERAN. The Narrowband AMR is being designed for HR 8-PSK channels. The new speech codec wideband AMR is also being introduced, both for FR GMSK and FR 8-PSK. These new codecs require at least 8 rates per physical subchannel (FR, HR, etc). Each rate needs to have its own convolutional coding and puncturing table in memory. At the same time, each channel coding rate has to have performance requirements for 22 different propagation conditions specified in 45.005. After implementation of the new channel coding in the product, everything needs to be tested and verified.

For voice over IP, when adding an IP header to the voice frames, it is no longer possible to use the existing optimized voice bearers defined for GSM since the payload format changes. If IP header compression is used, the size of the compressed header will vary over time. A new layer one transport channel scheme is needed for each speech codec mode/IP header size combination to transport the IP header together with the speech. Therefore "Optimized VoIP" has been discussed in GERAN standardization, where the basic idea is to remove the IP header. By doing so, it is possible to use standard AMR optimized channel coding. Some disadvantages with the current solution are absence of IP transparency, handover between cells with different AMR capability, and a different solution compared to UTRAN (the VoIP application will be RAN dependent).

The IP Multimedia Subsystem is being defined in 3GPP for REL-5. One example is unequal error protection on packet switched conversational multimedia services where several subflows (bit classes) will be transported down to the physical layer. This enables robust header compression (ROHC) to be used in combination with UEP/UED. Currently, GERAN can not use the same solutions developed for UTRAN.

Additional services can be expected in the future, for instance new streaming services for video applications. Also for these, new layer one transport channel schemes are needed.

Thus, the traditional way of using predefined and fixed layer one transport channel schemes disadvantageously implies memory-consuming and complex implementations at the physical layer, as well as costly changes in order to be able to provide new services. New layer one transport channel schemes are needed for each new service and for each new physical channel on which a service must be transported.

The invention advantageously provides flexibly configurable layer one transport channels for producing radio blocks in response to communication information and for extracting communication information from radio blocks. According to some exemplary embodiments, each transport channel includes an encoder or a decoder coupled to and cooperable with a data puncturer or a data repeater. According to some exemplary embodiments, an information source produces for each transport channel first configuration information and second configuration information, wherein the first configuration information is indicative of how the associated transport channel is to be configured if a first modulation type is used for a current radio block, and wherein the second configuration information is indicative of how the associated transport channel is to be configured if a second modulation type is used for the current radio block. According to some exemplary embodiments, the physical layer includes a description information source that provides description information from which various configurations of the transport channels can be determined. The description information source provides the description information in the physical layer in response to further information which the description information source receives from a higher layer and which is indicative of a service request initiated by a communication network. According to some exemplary embodiments, one of the transport channels is enabled to extract its associated communication information from a radio block while another of the transport channels is maintained disabled. The one transport channel provides the extracted communication information to a decision maker in a higher layer. In response to the extracted communication information, the decision maker decides whether the other transport channel should be enabled, and provides to the physical layer an indication of its decision. The other transport channel can then be enabled if the decision maker provides an enable indication.

BRIEF DESCRIPTION OF THE DRAWINGS

FIG. 3 diagrammatically illustrates the layer one transport channels of FIG. 2 in greater detail.

FIG. 4 illustrates the format of an exemplary radio block according to the invention.

FIG. 5 illustrates the response of the present invention to an RAB request from a core network.

FIGS. 6 and 6A illustrate information elements included within exemplary Transport Format Combination Set descriptors according to the invention.

FIG. 7 illustrates in tabular format exemplary CRC types which can be represented by the value of a corresponding field in FIG. 6.

FIG. 8 illustrates in tabular format exemplary error correction code types which can be represented by the value of a corresponding field in FIG. 6.

FIG. 9 illustrates in tabular format radio block sizes which can be represented by the value of a corresponding field in FIG. 6.

DETAILED DESCRIPTION

The present invention permits customized and/or optimized layer one transport channels to be configured while a given call is being set up. These layer one transport channels can be configured, for example, in a manner that will best support the service associated with the call.

Figure 1:
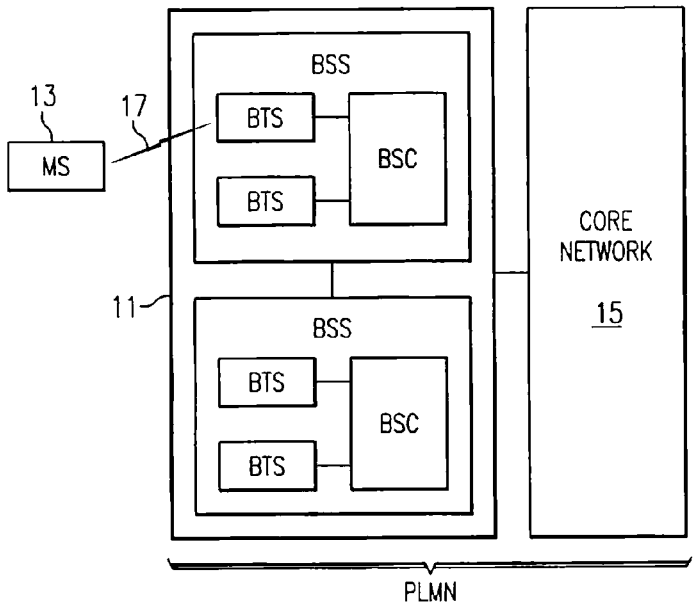
FIG. 1 diagrammatically illustrates a mobile station in radio communication with a PLMN according to the prior art.
Figure 2:
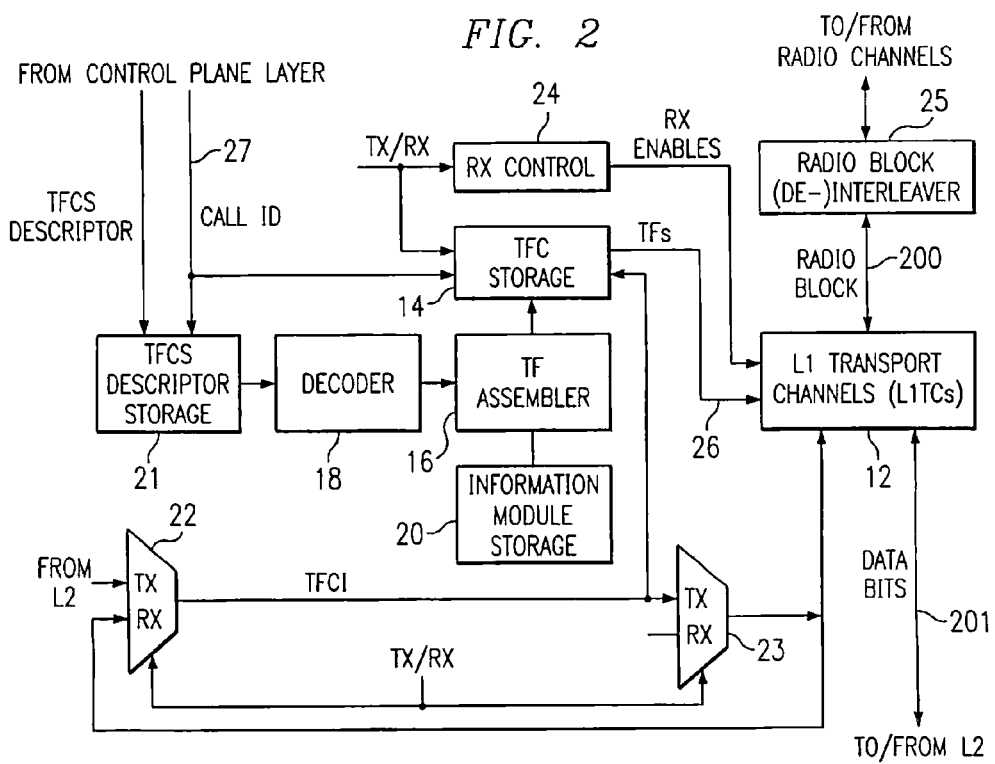
FIG. 2 diagrammatically illustrates pertinent portions of exemplary embodiments of a radio transceiver that supports communication across the radio interface of FIG. 1.

FIG. 2 diagrammatically illustrates pertinent portions of exemplary embodiments of a radio transceiver according to the invention, for example a radio transceiver within a mobile station of the type generally shown at 13 in FIG. 1, or a radio transceiver within a base transceiver station (BTS) of the type generally shown in FIG. 1. The transceiver portion illustrated in FIG. 2 resides generally in layer one (the physical, or PHY, layer) of the transceiver. A plurality of layer one transport channels (L1TCs) at 12 communicate data bits bidirectionally with layer two (L2) at 201. The layer one transport channels at 12 also communicate radio blocks bidirectionally with a radio block interleaver/de-interleaver 25 at a radio block port 200. The radio block interleaver/de-interleaver 25 is in turn coupled for bidirectional communication with physical radio channels (e.g., GERAN physical subchannels). Of course, a modulator/demodulator is interposed between the radio block interleaver/de-interleaver and the physical channels. This structure, which is well known in the art and not necessary to understand the invention, is not explicitly shown in FIG. 2.

The layer one transport channels are configured in accordance with configuration information designated herein as transport formats (TFs). Each layer one transport channel is configured according to a respective transport format. A group of transport formats that define the layer one transport channels for a given call are referred to herein as a transport format combination (TFC). A plurality of transport format combinations can be stored in a TFC storage device 14, and the constituent transport formats of a selected transport format combination are output at 26 from the storage device 14 in order to configure the transport channels 12 for transmission or reception of a given radio block at radio block port 200. For radio block reception, the layer one transport channels at 12 are configured by their respective transport formats to produce data bits at 201 in response to the received radio block at 200, which data bits are forwarded to layer two. In transmission operations, the layer one transport channels 12 are configured by their respective transport formats to produce an outgoing radio block at 200 in response to data bits received at 201 from layer two.

The transport format combinations are produced by a transport format assembler 16 and then stored at 14. The transport format assembler 16 assembles each individual transport format of every transport format combination in response to information received from a decoder 18, and also in response to information modules stored in an information module storage device 20. Each information module stored at 20 contains information which can be used to configure a layer one transport channel to perform a desired function, for example CRC coding, error correction coding, code puncturing, code repetition, and interleaving. In response to control information received from the decoder 18, the transport format assembler 16 retrieves selected information modules from the storage device 20 and assembles those modules together to produce a transport format which will be used to configure an associated layer one transport channel at 12. For example, a transport format for transmitting may include information modules respectively corresponding to CRC coding, error correction coding and code puncturing. An exemplary transport format for receiving may include information modules respectively corresponding to de-interleaving, error correction decoding and CRC decoding. The information module storage device 20 can include, for example, information modules respectively corresponding to a plurality of CRC coding/decoding schemes, and information modules respectively corresponding to a plurality of different error correction coding/decoding schemes.

Thus, the transport format assembler 16 is capable of assembling many different transport formats that respectively correspond to different possible combinations of the information modules stored at 20. As mentioned above, the assembler 16 also groups individual transport formats together into transport format combinations which are stored at 14. Each transport format combination can be used to configure a plurality of layer one transport channels at 12, each transport channel configured by a respectively corresponding transport format of the transport format combination.

The decoder 18 provides the control information to the transport format assembler 16 in response to a transport format combination set (TFCS) descriptor stored at 21. The TFCS descriptor is received from a control plane layer of the transceiver. The TFCS descriptor is provided on a per call basis, so each TFCS descriptor is associated with a corresponding call identifier (call ID), also provided from the control plane layer at 27. The TFCS descriptor for a given call contains all information needed by the transport format assembler 16 to assemble a set of all transport format combinations which will be available for use during the associated call. The TFCS descriptor includes the information needed by the transport format assembler 16 to group the various transport formats into the appropriate transport format combinations for storage at 14. The transport format combinations are applied to configure the layer one transport channels 12 on a per radio block basis. More specifically, for each incoming or outgoing radio block, a new transport format combination can be selected from the storage device 14 for appropriate configuration of the layer one transport channels. The layer one transport channels at 12 then either produce the radio block at 200 from the data bits at 201, or produce the data bits at 201 from the radio block at 200.

The transport format combination storage device at 14 can include transport format combination sets respectively corresponding to a plurality of different TFCS descriptors that respectively correspond to a plurality of different calls. The TFCS descriptors are provided during call set up, along with the call identification information at 27. The TFCS descriptors are stored at 21 (indexed, e.g. by the associated call IDs), and are available to the decoder 18. The decoder 18 decodes each TFCS descriptor and provides to the transport format assembler 16 all information needed to assemble the transport format combination set associated with the TFCS descriptor. The assembler 16 can assign transport format combination indicators (TFCIs) which uniquely identify the respective transport format combinations of the set specified by a given TFCS descriptor. The transport format assembler 16 can use the TFCI to index each of the transport format combinations in the storage device 14, and the call ID can be used to index the desired transport format combination set in device 14. The assembler 16 can assign TFCI values, for example, in the order in which it produces and stores the TFCs of the TFCS. In some embodiments, TFCI for a given TFCS can have values from "1" through the total number of TFCs in the TFCS.

During transmissions, layer two provides the TFCI to layer one in order to specify which transport format combination is desired for the current radio block of the current call. A TX/RX signal 28, indicative of whether transmission or reception operations are occurring, controls a selector 22 so that the TFCI is provided to the storage device 14 directly from layer two during transmission operations. The transport format combination storage device 14 also receives the call ID 27 and the TX/RX signal. The call ID permits the storage device to determine which set of transport format combinations stored therein is to be accessed, TFCI indicates which transport format combination within that set is to be used, and the TX/RX signal indicates whether to use a receiving version of the selected transport format combination or a transmitting version of the selected transport format combination. The receiving version configures the layer one transport channels at 12 to receive radio blocks at 200 and produce therefrom data bits at 201, and the transmit version of the transport format combination configures the transport channels at 12 to receive data bits at 201 and produce therefrom a radio block at 200.

Also during transmissions, TFCI as received from layer two is passed through selector 23 for input to an associated one of the layer one transport channels 12. TFCI is processed by the associated layer one transport channel for inclusion in the radio block at 200. Each TFCS descriptor includes information which defines a transport format that will be used to configure a layer one transport channel for the TFCI, in order to permit the TFCI to be transmitted in the radio block to the receiving end. The transport format corresponding to TFCI is provided at 26 to the associated layer one transport channel. Also provided at 26 are the transport formats for one or more data channels corresponding to the data bits at 201. Each outgoing radio block is thus produced by passing the data bits at 201 and the TFCI through appropriate layer one transport channels at 12 to produce the radio block at 200.

During reception, the TFCI is received within the radio block 200, and passes through its associated layer one transport channel to storage device 14 via selector 22 (by virtue of the TX/RX signal indicating receive operation). Thus, the received TFCI can be applied to the storage device 14 in order to identify the transport format combination that is to be used to process the rest of the incoming radio block. The transport formats of the selected transport format combination are then applied to the corresponding layer one transport channels at 12, thereby permitting the remainder of the layer one transport channels to process the remainder of the radio block at 200 in order to produce the data bits at 201.

A receive (Rx) controller 24 can be utilized to control when the layer one transport channels are enabled during receive operation. The receive (Rx) enables produced by the receive controller 24 ensure that only the layer one transport channel associated with TFCI is enabled at first, and the receive controller 24 thereafter enables the remainder of the layer one transport channels, after the received TFCI has been used to obtain the desired transport format combination from the storage device 14.

FIG. 3 diagrammatically illustrates the layer one transport channels of FIG. 2 in more detail. FIG. 3 illustrates the layer one transport channels individually, with their respective transport formats and receive enable signals. As shown, the layer one transport channel for TFCI receives the corresponding TFCI transport format, designated as TF(TFCI). The layer one transport channel for TFCI, designated L1TC (TFCI) in FIG. 3, also receives a corresponding receive enable signal from the receive controller 24. This receive enable signal is designated EN(TFCI) in FIG. 3. FIG. 3 also illustrates an exemplary transport format combination, namely the nth transport format combination, designated as TFC(n). As shown in FIG. 3, TFC(n) includes $N_n$ transport formats, designated in FIG. 3 as TF(1) ... TF($N_n$). Thus, the nth transport format combination includes $N_n$ transport formats, which in turn configure $N_n$ corresponding layer one transport channels, designated L1TC(L) ... L1TC($N_n$) in FIG. 3. Each of the $N_n$ channels also receives a corresponding receive enable signal, designated as EN(1) ... EN($N_n$) in FIG. 3. For an exemplary transport format combination set having M transport format combinations, the index n in FIG. 3 can take values of 1, 2, ... M. Also, each of the M transport format combinations can include its own uniquely associated number of transport formats, designated as $N_n$ in FIG. 3.

During transmission, the layer one transport channels of FIGS. 2 and 3 collectively output a radio block at 200 and, during reception, the layer one transport channels collectively receive a radio block at 200 as input. FIG. 4 illustrates an example of a radio block that can be collectively output by the layer one transport channels, or can be received collectively as an input by the layer one transport channels. As shown in FIG. 4, the radio block includes a TFCI portion (e.g., a layer one header) which indicates the transport format combination that has been used at the transmitter and should therefore be used at the receiver also. The remainder of the radio block carries user data. The radio block illustrated in FIG. 4 corresponds to a value of n=M in FIG. 3, so the radio block includes NM user data portions (corresponding to $N_M$ L1TCs) in addition to the TFCI information portion. The portion of radio block 41 designated Transport Format 1 is the portion of the radio block that has been produced by L1TC(1) (transmit operation) or the portion of the radio block that is to be input to L1TC(1) (receive operation). Similarly, the portion of radio block 41 designated Transport Format NM represents the output of L1TC (NM) (transmit operation) or the input to L1TC(NM) (receive operation).

Because one or more of the layer one transport channels can be configured differently from all other layer one transport channels, and thus may have, for example, a different propagation delay than all other layer one transport channels, a multiplexing apparatus or other suitable parallel concatenating apparatus (not explicitly shown in FIGS. 2 and 3) can be coupled to the radio block side of the layer one transport channels to concatenate the outputs of the individual layer one transport channels together in order to format the radio block generally as shown in FIG. 4. The radio block formed in this manner can then be input to the radio block interleaver at 25. From the point where the radio block is input to the interleaver 25, the radio block can be subjected to generally conventional interleaving, modulating and any other suitable conventional processing (not explicitly shown) before transmission on the physical radio channel(s).

As mentioned above, when a call for a desired service is being set up, a 3G core network in a conventional PLMN transmits to the radio access network of the PLMN an RAB request that contains information about the service for which the call is being set up. In the example of a GERAN radio access network, the radio resource control (RRC or RR) layer of GERAN can be configured according to the invention to translate the RAB request into a corresponding TFCS descriptor (see also FIG. 2) for the call. The RRC (or RR) layer can perform this translation based on the above-described information provided in the RAB request, together with other information that is conventionally available in the radio access network, for example available radio resources, etc. The RRC (or RR) layer can be designed according to the invention to find a suitable configuration (specified by a TFCS descriptor) of layer one transport channels to fulfill the requirements in the RAB request, and at the same time economize with respect to resource utilization in the radio access network. The RRC (or RR) layer in GERAN (for example in a BTS of GERAN) can send the TFCS descriptor to the physical layer of GERAN, and can also send the TFCS descriptor to the RRC (or RR) layer of the mobile station. The RRC (or RR) layer of the mobile station can, according to the invention, forward the TFCS descriptor to layer one of the mobile station. The above-described exemplary handling of an RAB request is illustrated in FIG. 5. The example of FIG. 5 uses the RRC layer. In FIG. 5, layer one of the BTS and layer one of the mobile station are designated as the PHY layer.

Figure 6:
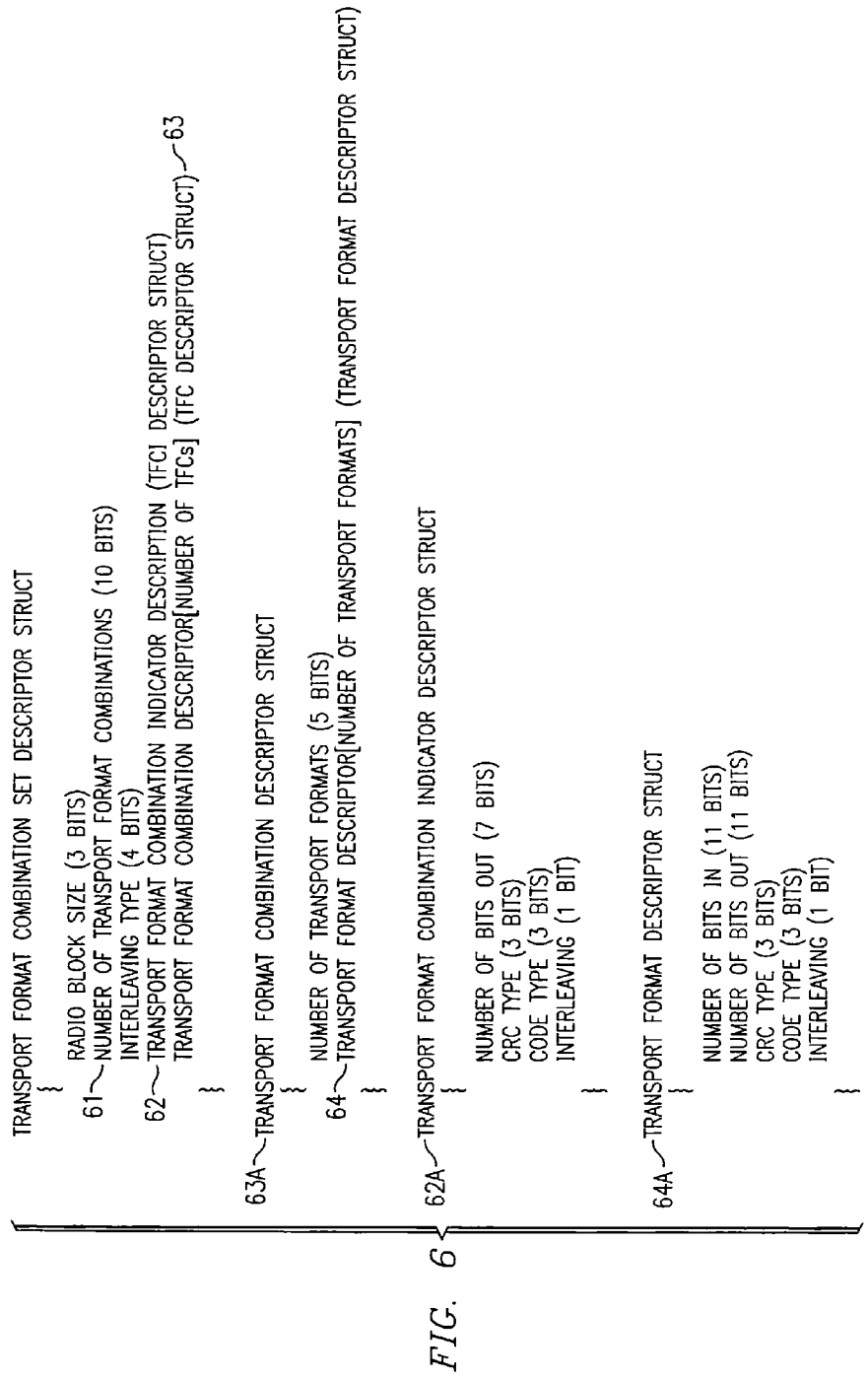

FIG. 6 illustrates an exemplary TFCS descriptor according to the invention. As indicated above, the TFCS descriptor includes all of the information that the transport format assembler 16 needs to assemble from the information modules stored at 20 all transport formats of each transport format combination that will be available for the call to which the TFCS descriptor corresponds. As shown in FIG. 6, the TFCS descriptor includes a field which specifies the size of the radio block (see also 200 in FIGS. 2 and 41 in FIG. 4), a field which specifies the number of TFCs available for use during the call, and a field which specifies the type of interleaving/de-interleaving that will be implemented by the radio block interleaver/de-interleaver at 25 in FIG. 2. The TFCS descriptor of FIG. 6 also includes a TFCI descriptor 62. This TFCI descriptor includes a data structure 62A having a field which specifies the number of bits which are to be output by the L1TC(TCFI) during transmission (the number of input bits for L1TC(TFCI) during transmission is implicitly known from knowing the number TFCs), a field which specifies the type of CRC coding/decoding that will be applied in L1TC(TFCI), a field which specifies the type of error correction coding/decoding that will be implemented in L1TC(TFCI) and, in the embodiment of FIG. 6, a 1 bit field which indicates whether or not interleaving is to be used within L1TC(TFCI). During reception, the output bits field of course specifies the number of bits that will be input to L1TC(TFCI). In some embodiments, L1TC(TFCI) is configured to provide better performance than the most robust of L1TC(1) . . . L1TC(NM).

The TFCS descriptor of FIG. 6 also includes a transport format combination (TFC) descriptor 63 which specifies the number of TFCs available for the call, and which further includes a TFC descriptor data structure for each TFC associated with the TFCS. An example of such a TFC descriptor data structure is shown at 63A.

Each TFC descriptor data structure includes a field which specifies the number of transport formats in that TFC, and also includes a transport format descriptor 64 that specifies, for each transport format of the TFC, a transport format descriptor data structure. An example of such a transport format descriptor data structure is shown at 64A. As shown in FIG. 6, an exemplary transport format descriptor data structure includes a plurality of fields which include information to be used by the transport format assembler 16 of FIG. 2 in assembling from the information modules at 20 the transport format that will be used to configure a corresponding layer one transport channel at 12. The transport format descriptor data structure example shown at 64A in FIG. 6 includes an 11 bit field for specifying the number of bits that will be input to the corresponding transport channel (for example during transmit), another 11 bit field for specifying the number of bits that will be output from the corresponding transport channel (again, for example, during transmit), a 3 bit field for specifying the type of CRC coding/decoding that will be used in the corresponding transport channel, another 3 bit field for specifying the type of error correction coding/decoding that will be used in the corresponding transport channel and, in the embodiment of FIG. 6, a 1 bit field for specifying whether or not the corresponding transport channel will apply interleaving/de-interleaving. If the "bits in" field and "bits out" field are defined for transmit operation, then they can simply be swapped with one another for receive operation.

The decoder 18 of FIG. 2 can extract from the TFCS descriptor (for example the TFCS descriptor of FIG. 6) all information needed by the transport format assembler 16 to produce the transport format combinations stored at 14. FIG. 7 illustrates in tabular format exemplary types of CRC coding/decoding which can be designated by corresponding CRC field values in the TFCS descriptor. The information needed to implement the various illustrated exemplary types of CRC coding/decoding can be contained in corresponding information modules stored at 20 in FIG. 2. Similarly, FIG. 8 illustrates in tabular format exemplary types of error correction coding/decoding which can be designated by the corresponding field values in the TFCS descriptor. Again, all information needed to implement the various exemplary types of error correction coding/decoding shown in FIG. 8 can be contained in corresponding information modules stored at 20 in FIG. 2.

FIG. 9 illustrates in tabular format various exemplary radio block sizes which can be specified by the radio block size field value of the TFCS descriptor. As illustrated in FIG. 9, different possible combinations of modulation and physical channel data rates have associated therewith different radio block sizes.

Figures 10, 12, 13:
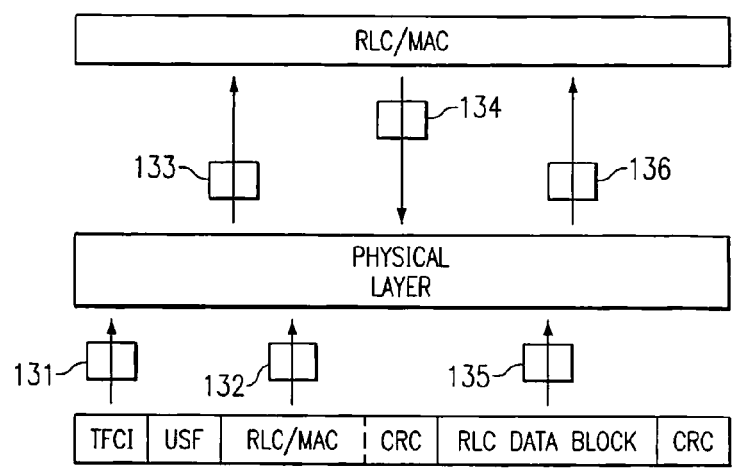
FIG. 10 illustrates in tabular format radio block interleave types which can be represented by the value of a corresponding field in FIG. 6.
FIG. 12 illustrates an exemplary Transport Format descriptor that can be used to selectively limit the layer one processing of incoming radio blocks according to the invention.
FIG. 13 conceptually illustrates exemplary operations which can be performed according to the invention in response to the Transport Format descriptor of FIG. 12.

FIG. 10 illustrates in tabular format various exemplary types of radio block interleaving which can be specified by the corresponding field value in the TFCS descriptor. Although the radio block interleaving/de-interleaving at 25 in FIG. 2 is not strictly a part of the layer one transport channels 12, and is not defined by the transport formats illustrated in FIG. 2, nevertheless this information provided in the TFCS descriptor can be extracted by the decoder 18 and provided to the interleaver/de-interleaver 25 (not explicitly shown in FIG. 2) to control the operation of the interleaver/de-interleaver 25.

Regarding the use of code puncturing or code repetition, either may be needed in the transport channels in order to ensure that the number of bits output by the transport channel (during transmit or receive) matches the number of bits specified by the transport format descriptor data structure associated with that transport channel. Puncturing would be necessary if the transport channel would otherwise produce a number of output bits larger than that specified by the transport format descriptor data structure, and repetition would be necessary if the transport channel would otherwise output a number of bits smaller than the number of output bits specified by the transport format descriptor data structure. The need for puncturing (or repetition) can be determined by the transport format assembler 16 when assembling the transport format combinations for storage at 14. If puncturing or repetition is used in a transport channel on the transmit side, then corresponding de-puncturing or de-repetition can be used in a corresponding transport channel on the receive side.

The puncturing (or repetition) pattern can be derived algorithmically based on the number of bits before and after puncturing (or repetition). The number of bits before puncturing (or repetition) is implicitly known (code rate*(information bits+CRC bits)). The number of bits after puncturing (or repetition) is a parameter (e.g., the "bits out" parameter of FIG. 6).

For instance, the puncturing can be derived as follows:

If a block of N bits shall be punctured to contain M bits, the bits at positions $J = \text{floor}(I*N/(N-M))$ are punctured, where $I = 0, \ldots N-M-1$ and "floor" means taking the integer part.

If, on the other hand, repetition shall be done, the repetition can be derived as follows:

If a block of N bits shall be repeated to contain O bits, the bits at positions

J=floor(I*N/(O−N))

are repeated, where

I=0, . . . , O−N−1 and "floor" means taking the integer part.

If error correction is required, the channel (i.e., error correction) coding can be chosen from a set of available channel coding types (see, e.g., FIG. 8). This set can, for instance, include non-recursive terminated convolutional coding, recursive systematic terminated convolutional coding and tail-biting convolutional coding and block codes. The constraint length of the convolutional codes is a parameter (e.g., 5 or 7 as shown in FIG. 8).

The rate of the error correction code is implicitly defined by the number of inbits (information bits+CRC bits) and the number of outbits after puncturing; in some embodiments, the rate is chosen as the highest rate possible considering the required number of output bits after rate matching. If a code rate lower than e.g. ¼ is needed, the rate ¼ can be chosen and repetition can be used to lower the code rate. The constraint length and the rate implicitly define the polynomials of the error correction codes (fixed polynomial sets). In one example application of the invention, layer one can be configured to support AMR. Assuming narrowband AMR, there are 8 channel codecs conventionally available, each having a different amount of class 1A bits and class 1B bits per 20 ms speech frame. This example assumes that 4 of the 8 channel codecs are available, so four TFCs would be needed (one for each codec). According to some embodiments of the invention, the class 1A bits and class 1B bits and AMR signalling (inband) bits can be transported through respectively different layer one transport channels, so each TFC would specify three transport formats: one for class 1A bits; one for class 1B bits; and one for the inband bits. A given TFC can correspond, for example, to a conventional coding scheme such as CS-1, O-TCH/AHS122 or O-TCH/AHS795. Thus, the TFCS can be seen to support conventional link adaptation.

In addition to the speech frames, call control signalling (e.g., FACCH) and silence information descriptor (e.g., SID UPDATE) can be supported on the physical subchannel. This results in a total of 6 TFCs specified in the TFCS descriptor, namely, the 4 TFCs for the 4 available codecs, one TFC for the call control signalling, and one TFC for the silence information descriptor.

Figure 11:
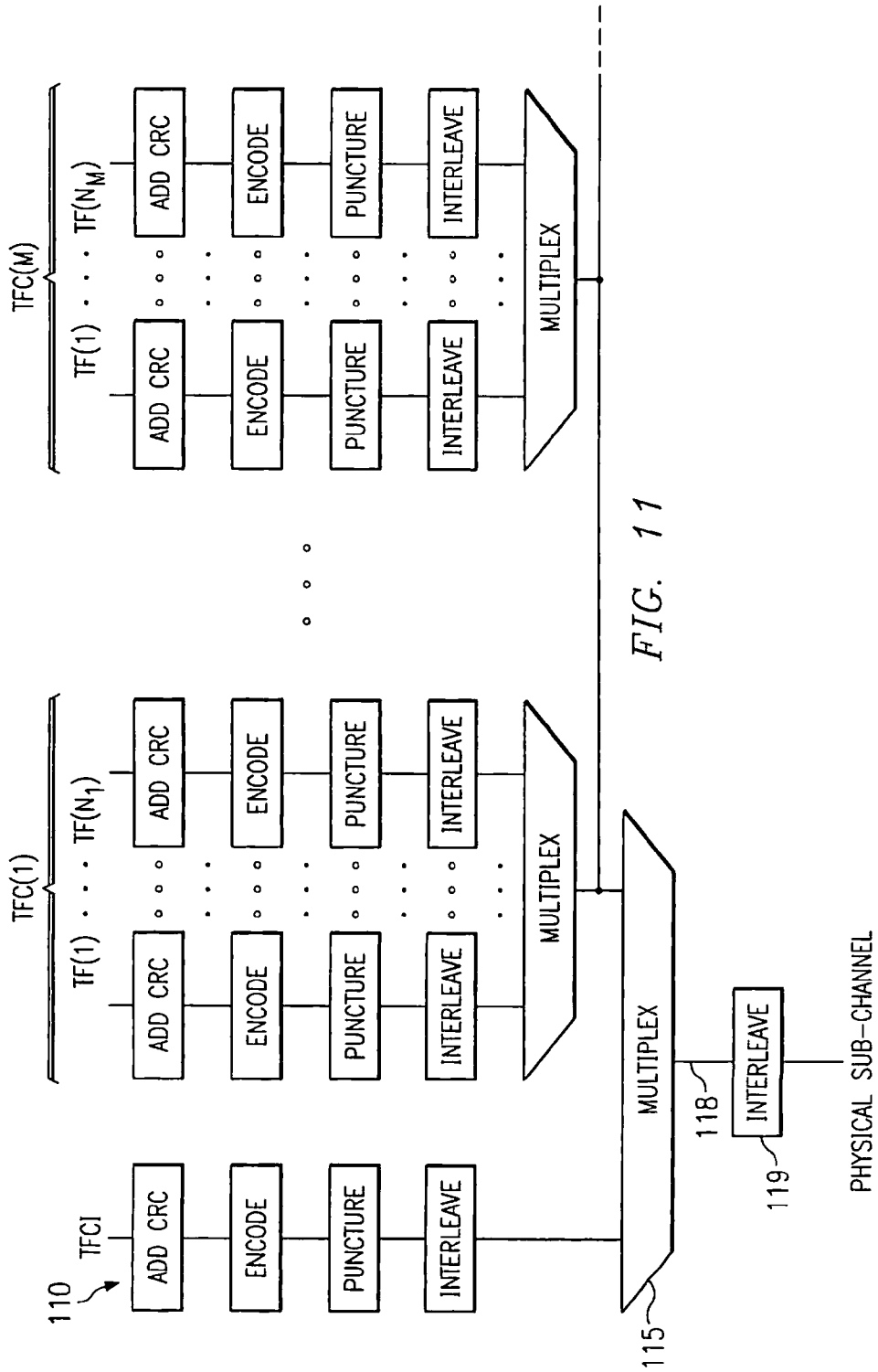
FIG. 11 diagrammatically illustrates examples of the layer one transport channels of FIGS. 2 and 3.

FIG. 11 conceptually illustrates exemplary operations according to the invention during transmission. As shown in FIG. 11, the TFCI passes through its corresponding layer one transport channel at 110, and the data bits received from layer two pass through the layer one transport channels specified by a selected one of TFC(1), TFC(2), . . . , TFC(M) (see also FIGS. 3 and 4 and discussion thereof above). As shown in FIG. 11, each TFC(n) for n=1. 2, . . . , M includes $N_n$ transport formats which in turn specify $N_n$ layer one transport channels. The outputs of the transport channels implemented by the selected transport format combination are concatenated together (e.g., by associated multiplexes), and the result is concatenated at 115 with the output of the TFCI layer one transport channel 110, thereby producing a radio block (see also FIG. 2) at 118 for radio block interleaving at 119. Each layer one transport channel illustrated in the example of FIG. 11 includes CRC coding, error correction coding, puncturing (or repetition), and interleaving. Corresponding transport channels at the receiver can include corresponding CRC decoding, error correction decoding, depuncturing (or de-repetition), and de-interleaving.

In view of the fact that the TFCI is not actually user data, and can be transmitted as a layer one header as shown, for example, in FIGS. 4 and 11, the layer one processing of all TFCI does not strictly constitute a transport channel for user data. How, because the operations performed on TFCI in layer one are analogues to those performed on the user data in layer one, the layer one processing of TFCI is also referred to herein as a layer one transport channel, (see also L1TC (TFCI) of FIG. 3).

The invention can also support the use of GMSK modulation and 8-PSK modulation on the same physical subchannel. One exemplary embodiment defines transport format combinations and corresponding transport format combination indicators for each type of modulation. Blind detection can then be performed at the receiving side on a per radio block basis before decoding the TFCI information. In order to limit the complexity, such multi-modulation support could be allowed, for example, only for block interleaved data. FIG. 6A illustrates an exemplary TFCS descriptor for such multi-modulation operation.

When a shared physical subchannel is used in the downlink (e.g., from 11 across 17 in FIG. 1), all radio blocks on the channel are not necessarily intended for one MS. Instead, several MSs can listen to one physical subchannel. Based on information within each received block, each MS decides whether it is the intended recipient of the block. This is the situation, for example, in GPRS and EGPRS. Since the conventional layer one is aware of what each part of the block contains, layer one of each MS can decode only the parts of the block needed to decide if the block is intended for that MS. To achieve flexibility, the receiving layer one according to some embodiments of the invention is not aware of the contents of the radio block data—except for the L1 header (containing the TFCI). In such embodiments, layer one only decodes the block and delivers it to layer two. This means decoding all blocks entirely. This has the drawback that processing power and battery power can be wasted on blocks not intended for the MS.

The situation can be even more severe when the MS has no ongoing downlink data flow, but only an uplink flow. In conventional GPRS and EGPRS, for example, a special part of the downlink radio blocks, called the uplink state flag (USF), tells the MS whether it is allowed to transmit in uplink or not. If there is no ongoing downlink flow, only the USF needs to be decoded. However, if all parts of the downlink block are decoded in layer one and delivered to higher layers in the MS, and if the higher layers then use only the USF, this causes unnecessary power consumption.

When conventional incremental redundancy is used, the physical layer (e.g., in EGPRS) needs to know the RLC sequence number of the received block(s) in order to perform soft combination of earlier transmissions of the same block. Conventionally, layer one extracts the RLC sequence number from the RLC/MAC header. This type of operation is problematic in inventive embodiments wherein layer one is unaware of the content of the received radio block.

Therefore, some embodiments of the invention delay the operation of selected L1TCs during reception. So, initially (after extracting TFCI), only a subset of the L1TCs operate to deliver information to higher layers. The higher layers then interpret the received information to decide what additional L1TCs should be enabled for operation.

To support this, a Send Up bit is included in the transport format descriptor. The Send Up bit indicates whether or not the L1TC should operate and send its output to a higher layer. Thus, the Send Up bit(s) of a TFC indicate whether all L1TCs should operate, or whether only a subset of all L1TCs should operate initially, pending a decoding order from a higher layer. The exemplary transport format descriptor structure of FIG. 12 includes such a Send Up bit. In some embodiments, the Send Up bit can be stored by assembler 16 (of FIG. 2) in TFC storage 14 along with the corresponding transport format.

For example, a scheme similar to EGPRS could be achieved if only the L1TCs that handle the RLC/MAC header and the USF are operated initially. Based on the result, higher layers can decide if the remaining L1TCs should be operated.

FIG. 13 illustrates exemplary operations which can be performed according to the invention in response to a Send Up bit such as shown in FIG. 12. At 131, the received TFCI information is passed through its corresponding L1TC in order to determine which TFC is being used. All transport formats of the TFC are then inspected for active Send Up bits. In the example of FIG. 13, the transport formats associated with the RLC/MAC header and the USF include active Send Up bits, so the RLC/MAC header and the USF are passed through their corresponding L1TCs to higher layers. This is illustrated at 132 and 133 in FIG. 13. Based on the content of the RLC/MAC header (e.g. an address therein such as the temporary flow identifier TFI used in conventional GRRS/EGPRS), the RLC/MAC layer tells layer one whether or not to enable the L1TC associated with the RLC data block. In the example of FIG. 13, the L1TC for the RLC data block is enabled, as illustrated at 135, and the RLC information produced by that L1TC is forwarded to the RLC/MAC layer at 136. Also in FIG. 13, the RLC/MAC layer can determine from the USF information (forwarded at 132 and 133) whether or not transmission is permitted in the next uplink block.

Figure 14:
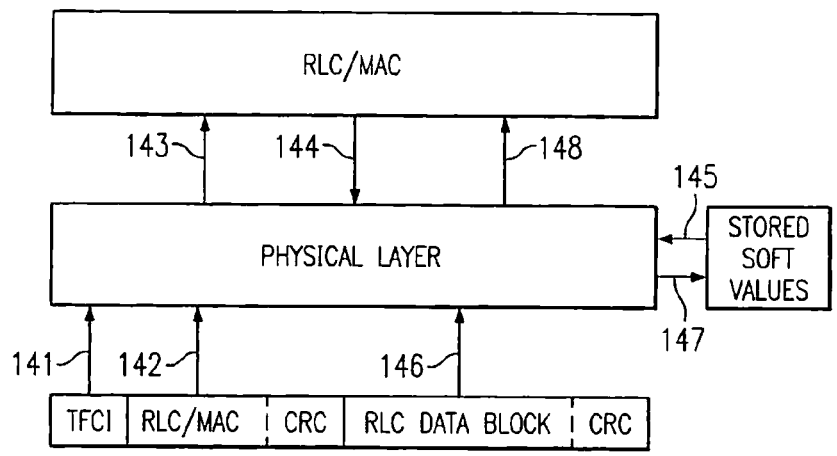
FIG. 14 conceptually illustrates further exemplary operations which can be performed in response to the Transport Format descriptor of FIG. 12.

FIG. 14 illustrates exemplary operations which can be performed in response to Send Up bits when incremental redundancy is supported. At 141, L1TC(TFCI) is enabled so that the TFCI information can be examined to determine which TFC is being used. Also at 141, the Send Up bit of each transport format of the selected TFC is inspected. In the example of FIG. 14, the transport format associated with the RLC/MAC header includes an active Send Up bit, so the corresponding L1TC is enabled at 142, in order to permit the RLC/MAC header information to be forwarded to the RLC/MAC layer at 143. At 144, the RLC/MAC layer provides an RLC sequence number to layer one, together with an instruction to enable the L1TC associated with the RLC data block. At 145, previously stored soft values of a previously received RLC data block having the same RLC sequence number are obtained and, at 146, the presently received RLC data block (from the received radio block) is applied to its L1TC. The L1TC for the RLC data block uses the stored soft values retrieved at 145 and the present RLC data block (which also includes soft values) to decode the present RLC data block. At 147, new soft values produced by operation of the L1TC (for example, due to incorrect CRC) are stored and, at 148, if the CRC is correct, the RLC data produced by the L1TC is forwarded to the RLC/MAC layer.

Soft values are real numbers, indicating both the value (1 or 0) of a received bit, and the likelihood that the bit was correctly received. A positive sign of the soft value indicates a "0" while a negative value indicates a "1". A large absolute value indicates a reliable bit, while a small absolute value indicates an unreliable bit.

Figure 15:
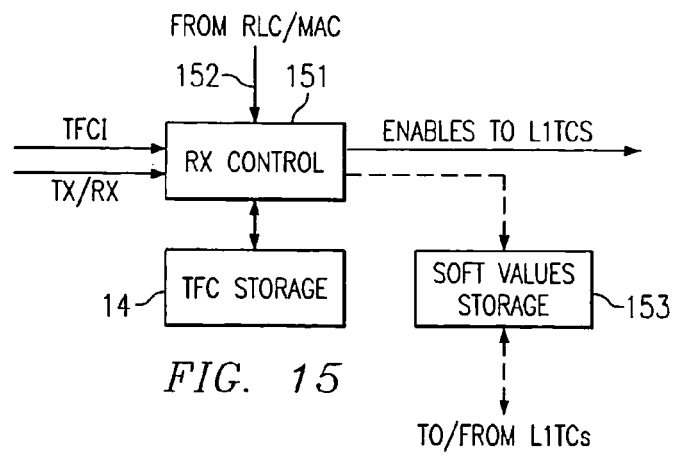
FIG. 15 diagrammatically illustrates pertinent portions of exemplary embodiments of a radio transceiver which can perform the operations illustrated in either or both of FIGS. 13 and 14.

FIG. 15 diagrammatically illustrates pertinent portions of exemplary transceiver embodiments that support the operations illustrated in FIGS. 13 and 14. When the TX/RX signal (see also FIG. 2) indicates receive operation, a receive controller 151 uses the received TFCI information to determine from TFC storage 14 which transport formats of the selected TFC include an active Send Up bit. The receive controller 151 then enables the L1TCs corresponding to those transport formats which include active Send Up bits. Thereafter, the receive controller 151 receives information 152 from the RLC/MAC layer, which information indicates which (if any) additional L1TCs should be enabled such that the information associated therewith can be forwarded to the RLC/MAC layer. The receive controller 151 is responsive to this information 152 to enable the remaining L1TCs accordingly. The operations of FIG. 14 can be supported by providing a soft values storage portion 153. In response to information (e.g. an RLC sequence number) received at 152 from the RLC/MAC layer, the receive controller 151 can cause the soft values storage portion 153 to exchange soft values with a selected L1TC (as shown by broken lines in FIG. 15), for example, the L1TC associated with the RLC data block of FIG. 14.

Referring again to FIG. 1, when GERAN, for example, is attached to a 2G core network, a specific service request is conventionally used instead of a generic RAB request. For example, Enhanced Full-Rate Speech can be requested in a conventional Assignment Request message from the 2G core network to GERAN. GERAN then conventionally selects a corresponding predefined coding scheme for that specific service. Unlike an RAB, the Assignment Request only signals a service, not the parameters associated with the service. Thus, the Assignment Request cannot be translated into a TFCS descriptor as in FIG. 5.

Some embodiments therefore store a preconfiguration for each service that is supported in the 2G core network. The preconfiguration contains all information necessary to configure the L1TCs for a service, for example, Wideband AMR, in terms of bit classes (transport formats), bits in/out, coding, etc. A preconfiguration table stored in the MS and in the radio access network, for example, in the BTS on the GERAN side, is used when the 2G core network sends an Assignment Request to set up the service. This advantageously permits the 2G core network to use its existing conventional signalling procedures.

Figure 16:
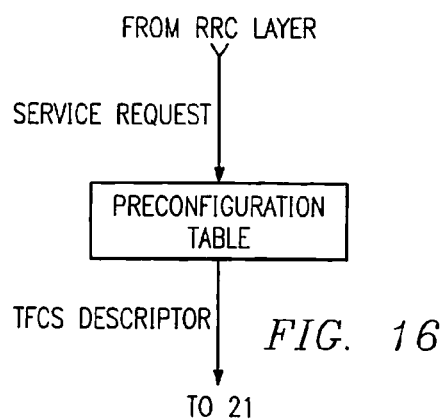
FIG. 16 diagrammatically illustrates pertinent portions of further exemplary embodiments of a radio transceiver according to the invention.

FIG. 16 diagrammatically illustrates pertinent portions of exemplary embodiments of a transceiver according to the invention which can support a service request from a 2G core network. It is initially noted that the service request received by the radio access network (or suitable information representative of the service request) can be distributed to layer one of both the radio access network and the mobile station in generally the same fashion that the TFCS descriptor is distributed to layer one of both the radio access network and the mobile station using for example, the RRC or RR layer (see also FIG. 5). As shown in FIG. 16, the service request, as received, in this example, from the RRC layer, is applied to a preconfiguration table 161 which is responsive to the service request to produce a TFCS descriptor which has been pre-selected for use with such a service request, and has been stored in table 161. The table 161 can store therein a plurality of TFCS descriptors indexed against corresponding service requests. The selected TFCS descriptor can be transferred to the storage device 21 of FIG. 2 and, from that point, the transceiver can operate, for example, generally as described above with respect to FIGS. 2–15.

It will be evident to workers in the art that the embodiments of FIGS. 2–16 can be implemented, for example, by suitably modifying software, hardware or a combination of software and hardware, in conventional radio access networks and mobile stations.

Although exemplary embodiments of the invention are described above in detail, this does not limit the scope of the invention, which can be practiced in a variety of embodiments.

What is claimed is:

1. A radio communication apparatus, comprising:

a physical layer portion and a higher layer portion coupled for communication therebetween;

said physical layer portion including a radio block port for coupling to a physical radio channel, said radio block port for receiving a sequence of radio blocks that each include communication information associated with operations of said higher layer portion, each said radio block facilitating transmission of its associated communication information on the physical radio channel;

said physical layer portion including a plurality of individually configurable transport channels coupled between said radio block port and said higher layer portion for interfacing between said radio block port and said higher layer portion, said transport channels collectively operable for one of producing said radio blocks in response to the associated communication information and extracting the associated communication information from said radio blocks, each of said transport channels including a configuration input for receiving transport format information associated with a current radio block of said sequence, said transport format information indicative of how the associated transport channel is to be configured with respect to said current radio block; and each said transport channel responsive to the associated transport format information for implementing one of an encoder and a decoder, and at least one of said transport channels responsive to the associated transport format information for implementing one of a data puncturer and a data repeater coupled to and co-operable with said one of an encoder and a decoder, said data puncture having an input for receiving a block of N bits, said data puncturer operable for puncturer the block to contain M bits by puncturing bits at positions bits at position J within the block, wherein J=floor(I*N/N-M)) for I=0, . . . N-M-1.

2. The apparatus of claim 1, wherein said at least one transport channel implements a data repeater, said data repeater having an input for receiving a block of N bits, said data repeater operable for repeating the block to contain O bits by repeating bits at positions J within the block, wherein J=floor(I*N/(O-N)) for I=0, . . . , O-N-1.

3. The apparatus of claim 1, wherein said one of an encoder and a decoder implements a convolutional code technique.

4. The apparatus of claim 1, including a transport format information source coupled to said configuration inputs of said transport channels for providing said transport format information thereto, said transport format information source having an input coupled to one of said higher layer portion and said radio block port for receiving therefrom selection information, said transport format information source responsive to said selection information for selecting said transport format information and providing said transport format information to said configuration inputs.

5. The apparatus of claim 4, wherein said transport channels are collectively operable for extracting communication information from said radio blocks, and wherein each said transport channel is operable for implementing a decoder.

6. The apparatus of claim 5, wherein said physical layer portion includes a further transport channel coupled between said radio block and said input of said transport format information source for extracting said selection information from the current radio block and providing the extracted selection information to said input of said transport format information source.

7. The apparatus of claim 4, wherein said transport channels are collectively operable for producing said radio blocks in response to communication information, and wherein each said transport channel is operable for implementing an encoder.

8. The apparatus of claim 4, wherein said transport channels are collectively operable for both producing said radio blocks in response to communication information and extracting communication information from said radio blocks, each said transport channel operable for implementing an encoder when said transport channels are collectively producing a radio block in response to communication information, and each said transport channel operable for implementing a decoder when said transport channels are collectively extracting communication information from a radio block.

9. The apparatus of claim 1, wherein said radio blocks are GERAN radio blocks.

10. The apparatus of claim 1, provided in one of a mobile communication station and a fixed communication station.

11. The apparatus of claim 10, wherein the fixed communication station is provided in a radio access network of a PLMN.

12. The apparatus of claim 1, wherein s aid communication information includes speech information.

13. A method of supporting radio communication, comprising:

interfacing in a physical layer between communication information associated with operations of a higher layer and radio blocks that each include some of said communication information, each said radio block facilitating transmission of its associated communication information on a physical radio channel;

said interfacing step including one of producing said radio blocks in response to the associated communication information and extracting the associated communication information from said radio blocks;

said producing step including specifying a plurality of encoding operations and applying said encoding operations respectively to portions of said communication information associated with a current radio block, and performing one of a data puncturing operation and a data repeating operation in cooperation with at least one of said encoding operations; and said extracting step including specifying a plurality of decoding operations and applying said decoding operations respectively to portions of a current radio block, and performing one of a data puncturing operation and a data repeating operation in cooperation with at least one of said decoding operations, wherein the data puncturing operation includes receiving a block of N bits, and puncturing the block to contain M bits by puncturing bits at position J within the block, wherein J=floor(I*N/(N-M)) for I=0, . . . N-M-1.

14. The method of claim 13, wherein said step of performing a data repeating operation includes receiving a block of N bits, and repeating the block to contain O bits by repeating bits at positions J within the block, wherein J=floor(I*N/(O−N)) for I=0, . . . , O−N−1.

15. The method of claim 13, wherein each of said applying steps includes implementing a convolutional code technique.

16. The method of claim 13, wherein said radio blocks are GERAN radio blocks.

17. The method of claim 13, wherein said communication information includes speech information.

18. The method of claim 13, wherein said interfacing step includes both said producing step and said extracting step.

* * * * *